Figure 1:
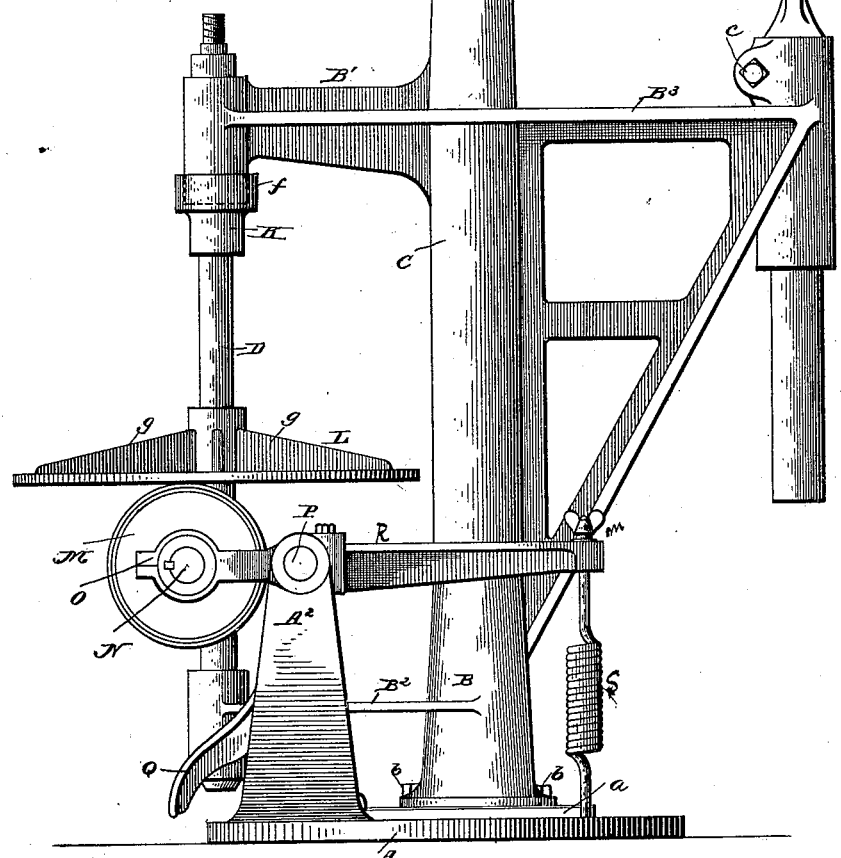

(No Model.) 3 Sheets—Sheet 1.

P. WILKES.
POTTERY JIGGER.

No. 404,941. Patented June 11, 1889.

WITNESSES
Edwin T. Yewell
John Enders Jr

INVENTOR
Peter Wilkes
By Wm. C. McIntire
Attorney (No Model.) 3 Sheets—Sheet 2.
P. WILKES.
POTTERY JIGGER.
No. 404,941. Patented June 11, 1889.
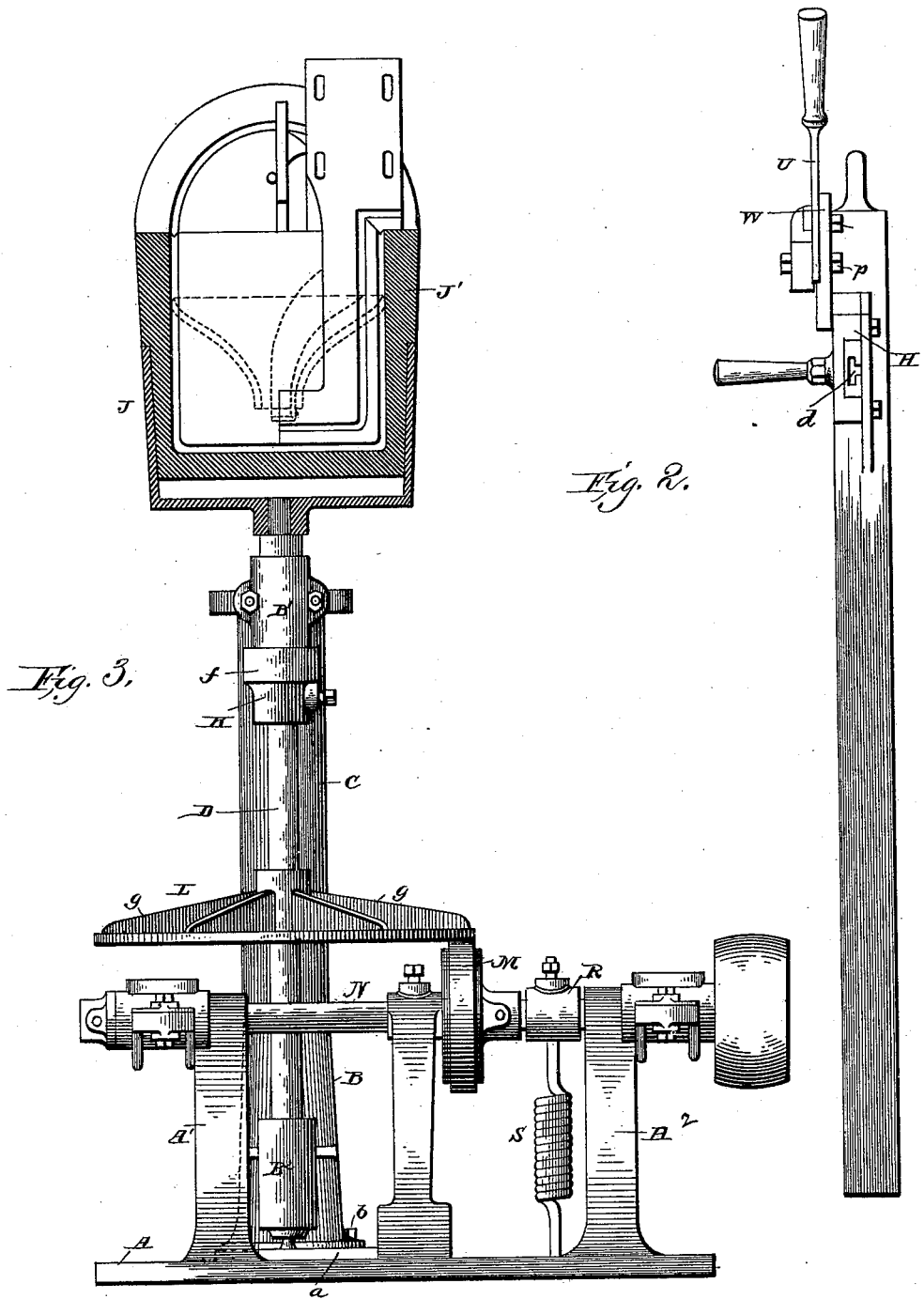
WITNESSES
Edwin I. Yewell
John Enders
INVENTOR
Peter Wilkes
By Wm. C. McIntire Attorney (No Model.) 3 Sheets—Sheet 3.

P. WILKES.
POTTERY JIGGER.

No. 404,941. Patented June 11, 1889.

WITNESSES
Edwin I. Yewell.
John Enders Jr.

INVENTOR
Peter Wilkes
By
Wm. C. McIntire, Attorney

UNITED STATES PATENT OFFICE.

PETER WILKES, OF TRENTON, NEW JERSEY.

POTTERY-JIGGER.

SPECIFICATION forming part of Letters Patent No. 404,941, dated June 11, 1889.

Application filed July 27, 1888. Serial No. 281,190. (No model.)

*To all whom it may concern:*

Be it known that I, PETER WILKES, a citizen of the United States, residing at Trenton, Mercer county, New Jersey, have invented new and useful Improvements in Pottery-Jiggers, of which the following is a specification.

This invention relates to certain new and useful improvements in pottery-jiggers; and it consists substantially in such features of construction, arrangement, and combinations of parts as will hereinafter be more particularly described, and pointed out in the claims.

The invention is designed more particularly as an improvement upon the class of machines similar to the one for which Letters Patent of the United States were granted me on the 6th day of January, 1874, and numbered 146,220; and the object of the present invention is to provide a machine of the character referred to which shall enable the production of such ware as cuspidors, ewers, jugs, and the like, the sides of which are usually of a swelled or convexed form, and the necks of which are contracted to a smaller diameter than the body. Heretofore it has been almost practically impossible to obtain a machine capable of the production or formation of such classes or shapes of ware, and their shaping has been usually effected by what is known in the art as "pressing" by hand.

By my present invention I am able to produce a pottery or earthenware vessel of any desired shape by the employment of formers or "profiles" conforming in their general shape to the particular shape of vessel desired.

In making vessels of a shape in which the body is swelled and the neck contracted I find it necessary or preferable to make the vessel of two parts—that is to say, I first make or shape the main body of the vessel by the use of a profile and plaster mold conforming to the shape of the vessel to be formed, and I then separately shapen or form the upper or contracted portion by the use of a profile and mold of proper shape. On the joining edge of one part of the vessel I form a V-shaped groove, and on the corresponding edge of the other part I form a V-shaped bead, and in this way the two parts are fitted the one to the other while still green. This method possesses many advantages in the formation or production of hollow pottery-ware, among the most prominent of which may be mentioned that a uniform thickness is had as well as an even shrinkage of material, thereby reducing to a minimum the loss of ware while being burned.

Figure 4:
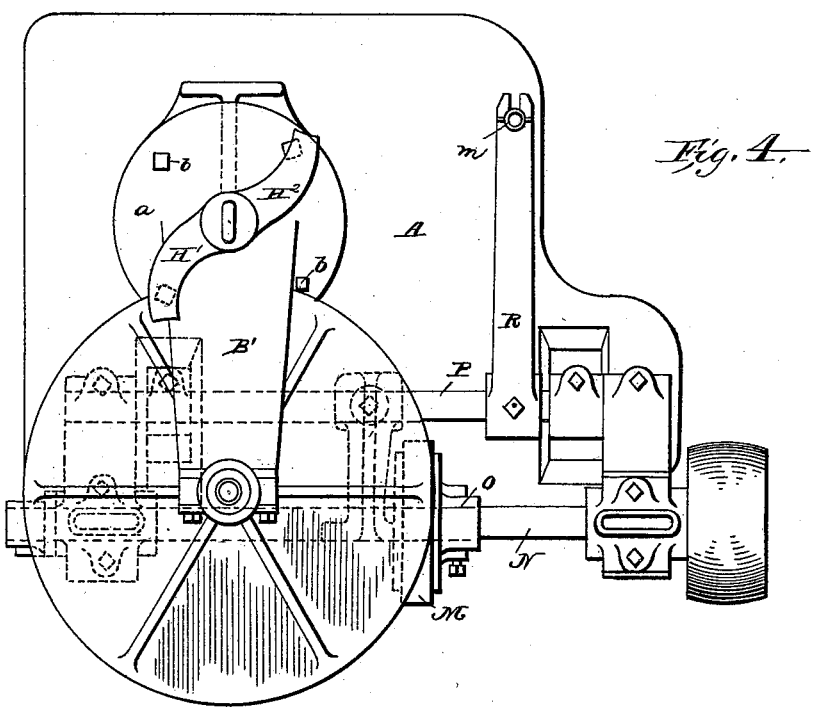
Figure 5:
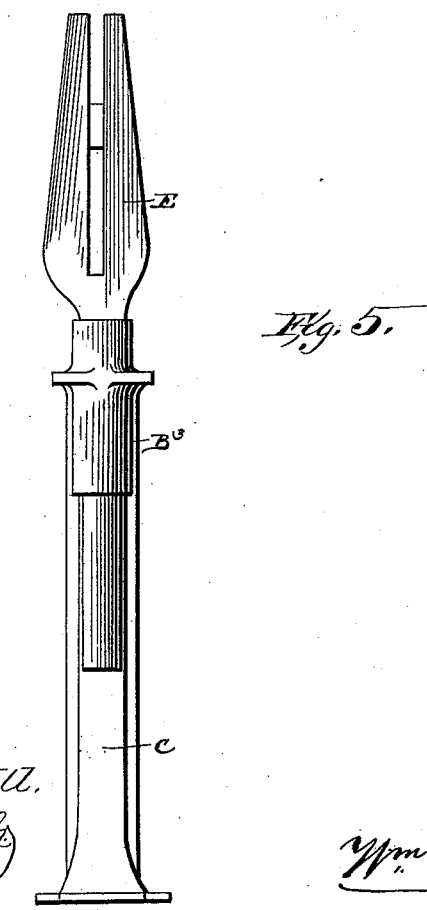

Referring to the accompanying drawings, Figure 1 represents a vertical side elevation of a pottery-jigger embodying my improvements; and Fig. 2 is an edge view of the horizontally-slotted arms, the cranks and the levers working therein, as well also as several appurtenant connections to these particular parts of the machine. Fig. 3 is a vertical front elevation of my improved machine, parts of which are indicated in section. Fig. 4 is a top or plan view, and Fig. 5 is a detail view of the bifurcated guide-arm.

Reference being had to the several parts by the letters marked thereon, A represents a suitable base-plate, to which are cast the brackets A' and A², forming a part of the same. On top of the base-plate A, I cast or provide a fitting-piece $a$, on which is bolted, as at $b$, the supporting-frame B for an upright column C, and to this frame are cast or provided the arms B', B², and B³, which are respectively the upper bearing and step or lower bearing of the jigger shaft or spindle D, and a clamp or support for a vertically-adjustable bifurcated bar E. The clamp B³ is constituted of a sleeve that is bored out smooth to fit the round or lower portion of the bifurcated bar E, and it is also slotted and provided with bolt-holes to receive a bolt $c$, by the tightening of which the said bar is clamped or held firmly in position. This bar is to be moved up or down, accordingly as deep or shallow ware is being made, and its upper forked or bifurcated end is to receive and guide the planed smooth arms F' F², which project outwardly from a round hollow shaft G, that fits and works up and down in the column C. The said guide-arms are cast or formed with the hollow shaft G, and they are centrally provided for their entire length with a T-shaped slot $d$, adapted for the reception and working of bolts $e\ e$, which serve as stops against which the tool or profile holders H H work, and which are more particularly hereinafter referred to.

Supported in and by the upper bearing B' is a vertical spindle D, made preferably of steel hardened on the lower end, where it is held in the step B², and having a thread formed on its upper end, to which is screwed the "jigger-head" J, into which the plaster molds J' are placed for forming the exterior surface of the ware being made. Surrounding this spindle, beneath the sleeve or bearing B', is a metal collar K, faced out on its interior surface to insure perfection of operation, and cast around its upper edge with a continuous flange $f$, to form a chamber for containing an oil to lubricate the lower portion of bearing B', which enters partly into the chamber thus formed, as shown. Between the collar K and bearing B', as well also as between the lower end of the spindle and the step B², I may employ a rawhide collar and disk for the purpose of reducing friction.

Fitted to the spindle D is a disk L, having extending from its center to its circumference a series of ribs $g$, to stiffen the same. After this disk is set-screwed to the spindle and made to nicely fit the same, it is nicely finished on its under surface to run perfectly true, and it is also very evenly balanced to prevent jarring or shaking while running. The spindle is rotated by means of a leather friction-wheel M, carried by a horizontal shaft N, which, as shown, is arranged to just clear the spindle; but the axes or centers of the latter and the shaft N may be made to meet or converge. Still, however, I prefer the arrangement herein shown.

The shaft N runs in bearings O O, which are attached to and form a part of a shaft P, located or arranged to the rear of and parallel with shaft N, the said shaft P having its bearings in the brackets A' and A², which, as before stated, are formed or cast with the base-plate.

I desire at this point of my description to call attention to the difference existing between the arrangement of my driving mechanism for the jigger-spindle and the arrangement heretofore existing in this class of inventions. Heretofore the disk has been fastened to a horizontal shaft and made to constitute the driver, while the friction-wheel has been attached to the jigger-spindle and brought into contact with the disk, thus becoming, mechanically speaking, the driven, the reason for such arrangement being that the parts may be better or more easily belted to without the use of an upright shaft, and also to give a variable speed, which is obtained by altering the position of the friction-wheel with respect to the disk which it operates, and when larger sizes of ware are to be made a correspondingly slow speed must be had; but in changing or moving the friction-wheel toward the center of the disk-plate to obtain this slow speed a sacrifice of power has of necessity to be made. The former arrangement of driving mechanism referred to has been found by me to be just exactly the reverse to what it should be, and as I have arranged it the friction-wheel is the driver and the disk is the driven; and simply by moving the friction-wheel away from the center of the disk I not only obtain the slower speed required when making larger sizes of ware, but also do I obtain an increased leverage on said disk.

Secured to and depending from the shaft P is a foot-lever Q, and also secured to said shaft and projecting therefrom horizontally is a spring-lever R, provided in its end with an eye or jaw, and through which passes the upper end of a spring S, the lower end of which spring is screwed into the base-plate, as shown, and on the upper end of said spring is a thumb-nut $m$ for the purpose of adjusting the tension to give to the wheel M the necessary friction or contact with the under surface of the disk. By slacking this thumb-nut a sufficient degree the operator can cause the friction-wheel to come out of contact altogether with the disk, and thus stop the machine, and when it is required only to stop the machine temporarily or momentarily all that is necessary for the operator to do is to simply press his foot upon the foot-lever.

The tool or profile holders H H work adjustably along the arms F' and F², and at whatever point they are or may be brought the bolts $e$ $e$ are slid along in the slots $d$ to bring them in contact with the edges of the holders, so as to maintain them at the point adjusted, it being understood, of course, that said bolts are then tightened in place. The profiles or tools for giving shape to the vessel or ware being made (no tool or profile being herein shown however) are secured to the holders in any suitable manner or way, and by way of clearness it may be stated that for larger sizes of ware the tool-holders are adjusted outwardly from center of driven spindle, while for the smaller sizes they are adjusted inwardly or toward the center of driven spindle.

Formed with the upper end of the hollow shaft is an eye G⁴, through which a rope is intended to be inserted and fastened, and thence passed over a sheave wheel or pulley (not shown) supposed to be located or arranged at any convenient point of the ceiling or floor above, and which pulley is intended to have a universal movement, the same as the pulley to which reference is made in my former Letters Patent referred to. This rope is weighted, and is intended to be used to raise the hollow shaft and permit the same to be turned, so as to reverse the positions of the tool-holders arranged on its radial arms.

H' and H² represent arms cast or formed with oblong slots $o$ $o$, which slots are for the purpose of holding fulcrum-bolts $p$ $p$ for levers U U, that are for the purpose of shifting the position of the tool-holders. These levers have a stud working in and guided by curved slots *s s*, formed in cranks W W, that are connected with the tool-holders, as shown at *v v*.

As stated at the beginning of my description, I usually make contracted vessels of swelled form in two parts; but when they are not very much contracted I make with one profile or tool only, and when it is desired to make or shape a vessel a jigger-head is screwed onto the upper end of the vertical spindle, the said head having placed therein a plaster-of-paris or other mold whose shape or contour is such as will give to the outer surface of the vessel the particular shape desired—that is to say, by this I mean when the lower half or part of the vessel is being made. I also secure to one of the tool-holders a profile or tool of the proper shape to press the clay against or around the sides of the mold, and thus after a certain degree of working or operation this lower portion or part of the vessel is formed. The upper or contracted portion of the vessel is made in a mold of a shape to conform to the shape of ware desired, and it will of course be understood in this connection that a different tool or profile is required, and that this part is made upside down or reversed.

In making quantities of ware of a particular form or shape it is my practice to secure to one of the tool-holders the profile for making one portion of the vessel, while to the other tool-holder is secured the profile for the other part, and when one has been operated, and the use of the other is desired, it is simply necessary to lift the hollow shaft sufficiently high to release its arm from the bifurcated guide and then swing the same around to bring the other profile into place over the jigger, and then again to lower said shaft sufficiently to bring the opposite arm into place to be in like manner guided and maintained in position by the said bifurcated guide-arm.

In order to enable the hollow shaft and its several parts to be adjusted vertically to suit varying heights or depths of vessels to be made, I provide to such shaft a surrounding sleeve or collar Z, that is slotted for its length, and has passing therethrough a bolt or screw *z*, having a thumb-nut, by the loosening of which said collar may be adjusted.

Having thus described my invention, what I claim as new, and desire to secure by Letters Patent, is—

1. The combination of the horizontal shaft P, having attached thereto and forming a part of the same the bearings O O, and the horizontal shaft held in such bearings and carrying the friction-wheel, substantially as described.

2. The combination, with the vertical spindle and its upper bearing, of the metal collar K, faced out on its interior surface and having around its upper edge a flange to form a lubricating-chamber, substantially as described.

3. The combination, with the shaft P, of the foot-lever Q, the horizontal arm R, provided at its end with a jaw, and the spring S, having its upper end passed through said jaw and its lower end screwed into the base-plate, the said spring being provided with the adjusting thumb-nut *m*, substantially as described.

4. The frame B, cast with the upper sleeve-bearing B', the clamp B$^3$, and the sleeve B$^2$, the said clamp B$^3$ being bored out smooth on its interior and slotted and provided with a tightening bolt and nut, substantially as described.

5. The upright column G, having the eye G$^4$, and turned smooth to fit into frame B, and cast or formed with the planed arms F' F$^2$ and arms H' H$^2$, the first-mentioned arms being formed for their entire length with T-slots adapted to receive adjustable stop-bolts, and the second-named arms being formed with oblong slots *o o*, substantially as and for the purpose described.

6. The combination, with the column G, having the upper and lower pairs of arms constructed as described, of the adjustable saddles or profile-holders and the stops therefor, the cranks W W, having the curved slots and connected to the tool-holders, and the levers for shifting the saddles, substantially as described.

In testimony whereof I have hereunto set my hand in the presence of two subscribing witnesses.

PETER WILKES.

Witnesses:
E. J. WAIT,
M. IDA PHARES.